G. C. HASTINGS.
MONUMENT MOLD.
APPLICATION FILED JAN. 17, 1920.

1,387,263.

Patented Aug. 9, 1921.

WITNESSES
Hugh H. Ott
P. H. Pattison

INVENTOR
G. C. Hastings,
BY Munn & Co.
ATTORNEYS

UNITED STATES PATENT OFFICE.

GROVER C. HASTINGS, OF MEMPHIS, TENNESSEE.

MONUMENT-MOLD.

1,387,263.   Specification of Letters Patent.   Patented Aug. 9, 1921.

Application filed January 17, 1920. Serial No. 352,005.

*To all whom it may concern:*

Be it known that I, GROVER C. HASTINGS, a citizen of the United States, and a resident of Memphis, in the county of Shelby and State of Tennessee, have invented a new and Improved Monument-Mold, of which the following is a full, clear, and exact description.

The present invention relates to new and useful improvements in molds and it pertains more particularly to molds of the expansible and separable type.

It is one of the primary objects of the present invention to provide a mold by means of which various sizes of molded articles may be constructed.

It is another object of the invention to provide reversible side members in order that the above-mentioned objects may be carried out without a multiplicity of parts.

It is a further object of the invention to provide a mold which may be completely knocked down when not in use.

With the above and other objects in view, reference is had to the accompanying drawings, in which—

Figure 1:
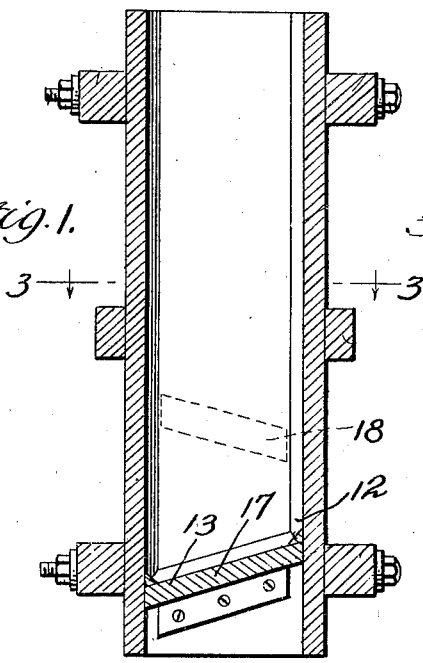
Figure 1 is a longitudinal sectional view of a device constructed in accordance with the present invention showing one position of the side members.

Referring more particularly to the drawings, the mold comprises two side members 5 adapted to be arranged in parallelism to each other, and two side members 6 adapted to be retained within the side members 5. The side members 5 are of greater width than the side members 6 and said side members 5 are provided with cleats 7, by means of which the side members 6 are maintained in position relative to the side members 5. Embracing the several side members after they are arranged in rectangular relation, are bars 8, said bars being notched for the reception of bolts 9. These bolts are screw-threaded as at 10 for the reception of nuts 11 to secure the bars 8 in a position to retain the mold in set-up form. The inner corners of the mold after it is so formed, are closed by filling strips 12.

Figure 2:
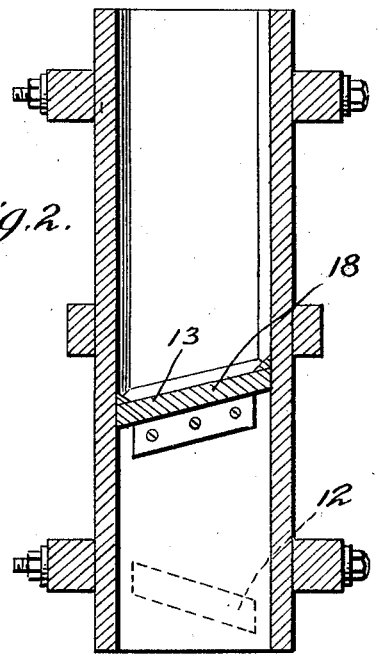
Fig. 2 is a similar view showing the side members in their other position.
Figure 3:
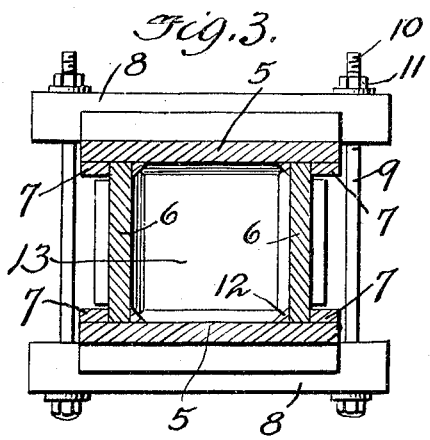
Fig. 3 is a horizontal sectional view taken on the line 3—3 of Fig. 1.

The reference character 13 designates an end plate and said end plate is supported upon cleats carried by the side members 6. As more clearly shown in Figs. 1 and 2, these side members 6 are provided with cleats 17 and cleats 18, the cleats 18 being secured to the side members 6 at a point nearer the center than are the cleats 17. By this construction it is apparent that as the side boards are reversed, the position of the closing or end plate 13 with respect to the ends of the mold may be changed, thus varying the length of the finished article.

Claims:

1. A concrete mold comprising a plurality of oppositely disposed side members, and means carried on two of the opposite side members for supporting end members, said oppositely disposed side members adapted to be reversed to support the end members in different positions relative to the length of the mold.

2. A mold comprising a plurality of side members, cleats carried on opposite sides of two of said side members, and end walls supported by said cleats, said cleats carrying side members being capable of reversal to position the end members at different points throughout the length of the mold.

GROVER C. HASTINGS.